(12) United States Patent
Bruck et al.

(10) Patent No.: US 10,076,786 B2
(45) Date of Patent: Sep. 18, 2018

(54) METHOD FOR PROCESSING A PART WITH AN ENERGY BEAM

(71) Applicant: Siemens Energy, Inc., Orlando, FL (US)

(72) Inventors: Gerald J. Bruck, Oviedo, FL (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 998 days.

(21) Appl. No.: 14/161,043

(22) Filed: Jan. 22, 2014

(65) Prior Publication Data

US 2015/0202717 A1   Jul. 23, 2015

(51) Int. Cl.
| | | |
|---|---|---|
| *B23K 26/08* | (2014.01) | |
| *B22F 3/105* | (2006.01) | |
| *B23K 25/00* | (2006.01) | |
| *B22F 5/04* | (2006.01) | |
| *F01D 5/12* | (2006.01) | |
| *B23K 26/342* | (2014.01) | |
| *B23K 26/082* | (2014.01) | |
| *B33Y 10/00* | (2015.01) | |

(52) U.S. Cl.
CPC .............. *B22F 3/1055* (2013.01); *B22F 5/04* (2013.01); *B23K 25/005* (2013.01); *B23K 26/082* (2015.10); *B23K 26/342* (2015.10); *F01D 5/12* (2013.01); *B33Y 10/00* (2014.12); *F05D 2230/22* (2013.01); *F05D 2230/31* (2013.01); *Y02P 10/295* (2015.11)

(58) Field of Classification Search
CPC .... B22F 3/1055; B23K 26/0876; B33Y 10/00
USPC .................. 219/121.78, 73.11, 73.21
See application file for complete search history.

(56) References Cited

U.S. PATENT DOCUMENTS

| | | | |
|---|---|---|---|
| 3,448,241 A | 6/1969 | Buckingham | |
| 3,627,979 A | 12/1971 | Quaas | |
| 4,331,857 A | 5/1982 | Crisci | |
| 4,741,974 A | 5/1988 | Longo | |
| 4,818,562 A | 4/1989 | Arcella et al. | |
| 5,437,820 A | 8/1995 | Brotz | |
| 5,837,960 A * | 11/1998 | Lewis | B23K 26/34 219/121.63 |
| 6,539,620 B1 | 4/2003 | Smashey | |
| 6,750,430 B2 | 6/2004 | Kelly | |
| 6,916,387 B2 | 7/2005 | Lulofs | |
| 7,653,995 B2 | 2/2010 | Morin | |
| 9,073,150 B2 * | 7/2015 | Graichen | B22F 9/24 |
| 2004/0094728 A1 * | 5/2004 | Herzog | B22F 3/1055 250/559.06 |

(Continued)

*Primary Examiner* — Dana Ross
*Assistant Examiner* — Lawrence Samuels

(57) ABSTRACT

A method of processing a component (10) with an energy beam (13) comprises simultaneously scanning and heating a first portion (12) and second adjacent portion (14) of the component with an energy beam (13) At a point or area of divergence of the portions of the component, the energy beam is controlled to repeatedly move back and forth between the portions of the component. This simultaneous heating of adjacent portions (12, 14) of the component is configured to keep a thermally-induced distortion of the component within a predefined tolerance. This dual-path processing may be performed on a bed of fluidized powdered material including a powdered metal material and a powdered flux material.

20 Claims, 2 Drawing Sheets

(56) References Cited

U.S. PATENT DOCUMENTS

| | | | |
|---|---|---|---|
| 2011/0127241 A1* | 6/2011 | Rumsby | B23K 26/0626 |
| | | | 219/121.62 |
| 2012/0181255 A1 | 7/2012 | Bruck | |
| 2013/0004680 A1* | 1/2013 | Godfrey | B22F 3/1055 |
| | | | 427/554 |
| 2013/0112672 A1 | 5/2013 | Keremes et al. | |
| 2013/0136868 A1* | 5/2013 | Bruck | B05D 3/06 |
| | | | 427/554 |
| 2013/0140278 A1* | 6/2013 | Bruck | B23K 25/005 |
| | | | 219/73.11 |
| 2013/0199013 A1* | 8/2013 | Graichen | B22F 9/24 |
| | | | 29/402.09 |
| 2014/0263209 A1* | 9/2014 | Burris | B23K 26/034 |
| | | | 219/121.62 |
| 2015/0202716 A1* | 7/2015 | Bruck | B23K 26/0661 |
| | | | 419/9 |

* cited by examiner

METHOD FOR PROCESSING A PART WITH AN ENERGY BEAM

FIELD OF THE INVENTION

The present invention is generally related to manufacturing techniques for forming or repairing a component, such as airfoils for blades or vanes for a combustion turbine engine; and, more particularly, to a method for processing a component involving use of an energy beam, such as a laser beam.

BACKGROUND OF THE INVENTION

Combustion turbine engines, such as gas turbine engines, typically include a turbine section having alternating arrangements of components, such as rotatable blades and stationary vanes A flow of hot gases from a combustor section expands against respective airfoils of the blades and vanes to rotationally drive the blades in the turbine section, where mechanical energy is extracted to turn a shaft, which may power a compressor section of the turbine engine.

During engine operation, the hot gases produce an environment that corrosively attacks the surfaces of the blades and vanes and often results in oxidation and corrosive pitting. The hot gases, soot from combustion, particles within the flow of hot gases, and other foreign objects also wear against the turbine blades and vanes and erode the surfaces of the blades, vanes, and other turbine engine components, which may undesirably reduce the useful life of the blades or vanes Additionally, the tip region (e g., a squealer tip) of the turbine blades is often subjected to a substantial amount of wear. For example, the blade tip may be abraded when it rubs up against a shroud of a casing in which the turbine blade rotates. High temperatures and stresses further degrade such components by thermo-mechanical fatigue (TMF) and result in cracking of components that are subjected to such loadings.

It is known to use laser-based processes for forming or repairing such components of turbine engines. United States Patent Application Publication No. US 2013/0136868 A1, authored by the present inventors, discloses improved methods for depositing superalloy materials that are otherwise difficult to weld. Those methods include the laser melting of powdered superalloy material together with powdered flux material to form a melt pool under a layer of protective slag. The slag performs a cleaning function in addition to protecting the molten alloy material from the atmosphere. Upon solidification, the slag is removed from the newly deposited superalloy material to reveal a crack-free surface and deposit. Such methods have been shown to be effective even for superalloy materials which are beyond the traditional region of weldability.

BRIEF DESCRIPTION OF THE DRAWINGS

The invention is explained in the following description in view of the drawings that show.

DETAILED DESCRIPTION OF THE INVENTION

The present inventors have innovatively recognized certain limitations in connection with known techniques that utilize a beam of energy, e g, lasing energy or other modalities of energy, for processing a component that may involve a relatively complex geometry For example, airfoils of blades, vanes, etc., that may be used in a combustion turbine engine involve such complex geometries. Non-limiting applications may include various additive manufacturing processes, including without limitation laser cladding, selective laser melting (SLM) or selective laser sintering (SLS) as may be used to fuse and deposit a layer of superalloy powder onto a superalloy substrate, etc.

Figure 1:
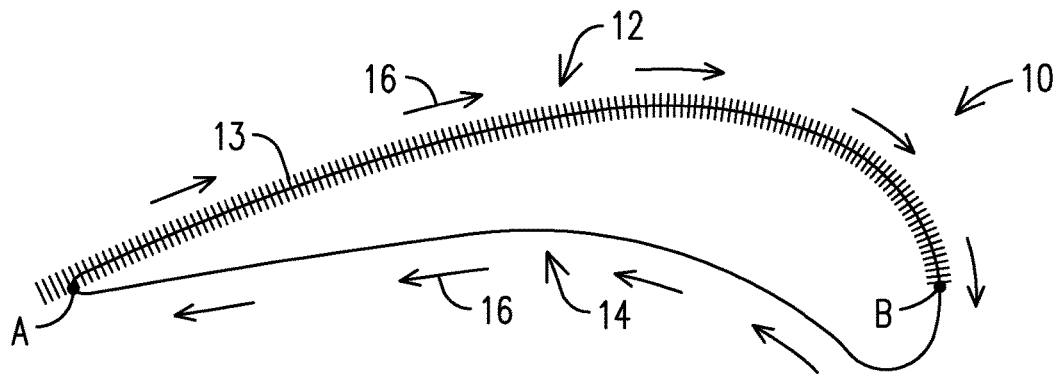
FIG. 1 is a schematic illustration of conventional single path energy beam processing of a component.
Figure 2:
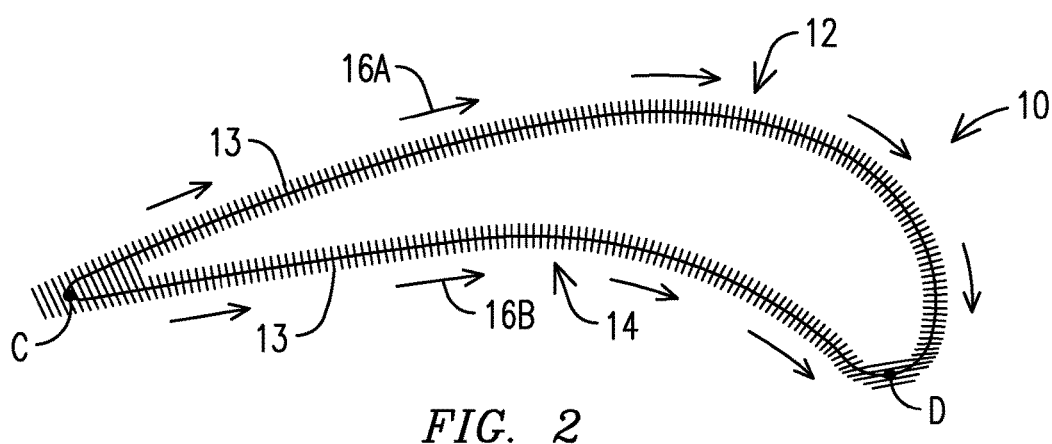
FIG. 2 is a schematic illustration of dual-path energy beam processing of a component.

In FIG. 1, a prior art laser processing path is schematically represented with respect to the additive repair or manufacture of a turbine blade tip 10, or it may also represent an airfoil for a turbine blade. Prior energy beam processing techniques used low power (e.g. 300 w) energy beam processing. The heat input to the blade tip 10 generated at such low power is low enough that the blade does not distort regardless of path progression. The inventors have discovered that using high power (e.g 2000 w) energy beam processing and one pass wrapping the blade in the continuous clockwise (or counterclockwise) path, as shown in FIG. 1, heat buildup is enough to cause the below noted distortion The blade tip 10 may be repaired or manufactured according to the above-described laser processing using a feeding of material coaxial with the laser beam or pre-placement of material such as in a bed of powdered metal material. The blade tip 10 includes a convex side 12 and concave side 14, both of which are substrates that exist in the initial casting and which may be further extended or repaired by laser clad deposition. From point A to point B a single rastered programmed laser path represented by arrows 66 is shown along a convex blade edge 12 of the blade tip 10. The slashing represents the energy beam 13, such as a laser beam During processing, the convex blade edge 12 is heated as metal deposit(s) is (are) added; however, heating of the convex edge 12 can cause shrinkage strains and distortion along the concave edge 14 of the blade tip 10. Thus, as the laser processing reaches the concave edge 14 of the blade tip 10 there is a misalignment with the concave blade edge 14 and the laser path The inventors have discovered that the simultaneous scanning and heating of the both convex edge 12 and the concave edge 14 results in balanced strains, reducing distortion of the edges 12, 14. With respect to FIG. 2, a rastered programmed dual-path energy beam processing is shown from a start point C to an end point D. As shown, at or adjacent to point C the convex side 12 and concave edge 14 are integrally connected and then diverge downstream from point C along the energy beam paths represented by arrows 16A, 16B. A "run on tab" may be provided so that beam 13 results in a steady state and properly dimensioned deposit as it reaches the component 10. In an embodiment, the laser beam 13 is widened as processing proceeds towards point D and along the edges 12, 14 For example, the beam may be widened from about 4 mm to about 12 mm. Three dimensional scanning optics are available to handle up to 10 kW of processing power. For this widened beam about 1 kW to 2 kW may be required for processing power. As the edges 12, 14 continue to diverge along the beam path, the beam 13 is controlled to move from one edge, e.g. 12, to the other edge, e.g. 14, to simultaneously and selectively heat powdered metal onto the edges 12, 14 along respective beam paths 16A, 16B The width of the beam may be reduced to for example 4 mm wide when scanning the beams 16A, 16B. The power may be increased to about 3 kW, or the travel speed could be slowed to ensure good fusion between the metal deposits and underlying substrate. The beam 13 may move from one edge to the other edge at a jump speed of 3 m/s at which speed it is not likely to generate enough heat to melt any powdered metal between the edges 12, 14

The beam 13 is controlled to stop the movement between the edges 12, 14 and is widened into (e.g. 12 mm wide) as the beam 13 approaches end point D and then is tapered into a smaller width beam (e.g 4 mm) onto for example a "run-off" tab The movement and rastering of the beam 13 may be accomplished with known multi-dimensional galvanometer-driven laser scanning optics.

Figure 3:
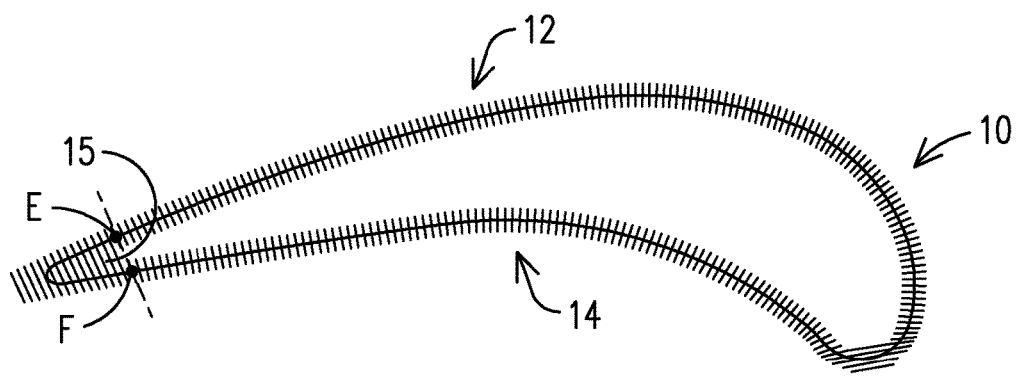
FIG. 3 is a schematic of another embodiment of dual-path energy beam processing of a component

This simultaneous heating and cladding of both the convex and concave edges 12, 14 of the blade tip 10 provides balanced shrinkage resulting in balanced strains, and reduced distortion thereby preventing the above-described misalignment. Another advantage of this multi-path simultaneous scanning and heating is that it involves a single pass/single layer and melted metal deposits do not overlap a previously solidified metal deposit. With respect to FIGS. 3 and 4, a schematic sectional view of turbine blade tip 10 with convex and concave edges 12, 14 is shown As described above, such geometries require simultaneous dual processing in close proximity For example, an energy beam 13 may start processing and is controlled to move between edges 12, 14 at points E and F. Simultaneous dual path processing at such a location may lead to melt pools, which tend to melt together into a single, wide melt forming an inter-path deposit 15 that is not completely fused to an underlying substrate. This inter-path melt 15 may prevent deposition of metal immediately downstream from the points E, F where the beam 13 is controlled to move from one edge to the other edge. This may be the result of surface tension of the inter-path melt 15 resisting separation of the melt 15 into two paths.

Figure 4:
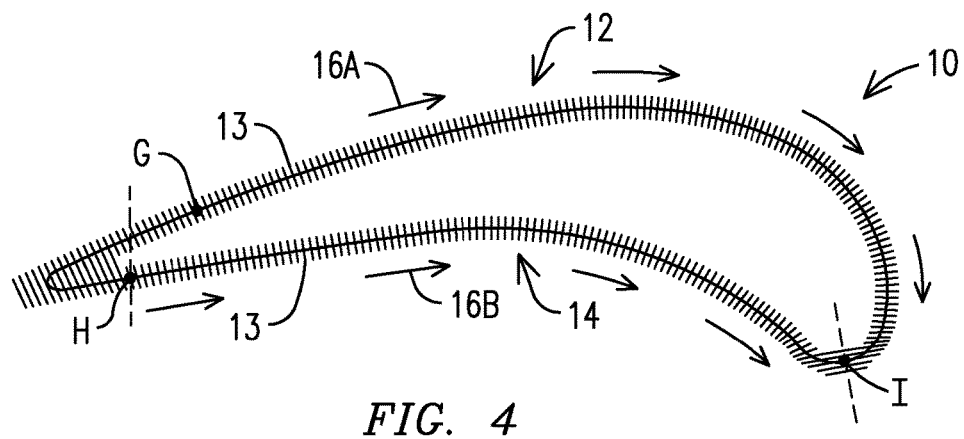
FIG. 4 is a schematic of a dual-path energy beam processing of a component illustrating an inter-path melt pool

A solution to this problem is illustrated in FIG. 4, which shows dual-path laser processing including staggered starting points G, H. As shown, processing of beam 13 along path 16A is allowed to progress past the start point H of beam path 16B to point G, at which time laser processing begins along beam path 16B at point H As described above, the beam 13 may be controlled to move between edges 12, 14 to simultaneously scan and heat powdered metal material on both edges 12, 14. When beam 13 begins scanning along beam path 16B (edge 14) at start point H, the metal deposit along beam path 16A (edge 12) is solidified and somewhat cooled. In addition, the use of the above described powdered flux material forms a layer of slag over the recently deposited metal, and this layer of slag insulates the metal deposit and provides resistance to re-melting of the deposition. The metal deposited along beam path 16A therefore does not merge with the metal deposit of path 16B.

In the embodiment shown in FIG. 4, the beam path 16A follows a convex side (edge 12) of the blade tip 10; therefore, beam path 16A is longer than beam path 16B along the concave side (edge 14) of the blade tip 10. Accordingly, processing along the first path 16A is allowed to proceed past the starting point H on the second beam path 16B, so that forward processing speeds along both paths 16A, 16B are similar or substantially the same. The magnitude of staggering between point G and starting point H may be on the order of 5 to 10 millimeters to avoid inter-path melting In another embodiment, a "run-on" tab may be added to the substrate of the second beam path to allow for additional separation of the beam paths 16A, 16B As the beam 13 approaches an end point wherein the two edges 12, 14 converge, the beam 13 is controlled to stop moving between the edges 12, 14, and the beam 13 may be widened, e.g 12 mm to cover the area at which the edges 12, 14 converge at point I. A "run-off" tab may be provided and the beam 13 may be tapered (e g to 4 mm) as it moves across the area of convergence including point I onto the "run-off" tab.

In the manufacture or repair of a blade tip 10, also referred to as a squealer, the above described staggered delayed start, re-melting does occur at point H. This is due, at least in part, because the blade tip often has a short (e.g. 10 or 20 mm) gap along the concave edge 14 where no tip is required. So a second start is actually occurring at point H that is not connected with the path 16A along the convex edge 12

Figure 5:
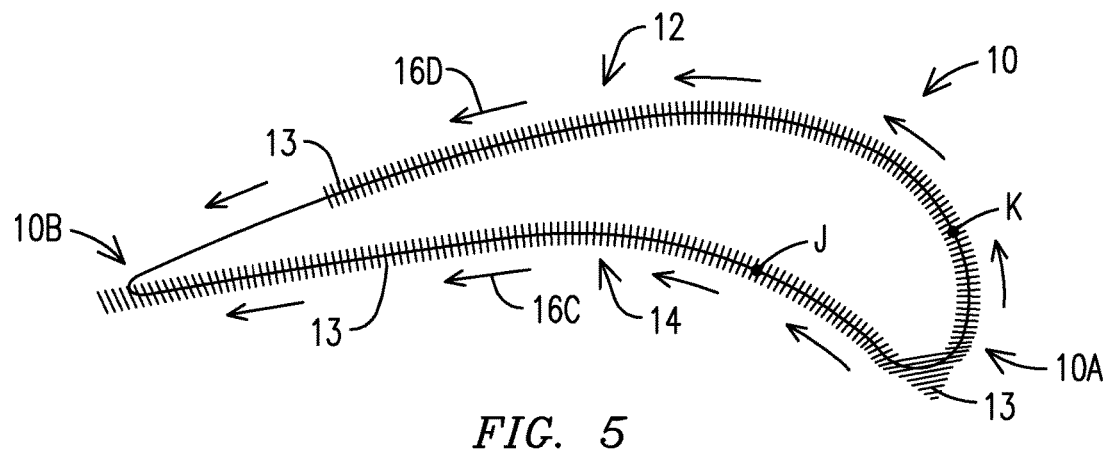
FIG. 5 is another embodiment of dual path energy beam processing of a component.

Another embodiment of a dual-path processing method is illustrated in FIG. 5, in which the dual-path laser processing is initiated from the opposite end of the blade tip 10. That is, the scanning begins at the larger or wider end 10A wherein the divergence of the edges is more dramatic than the divergence of the edges 12, 14 at end 10B. As described above, a "run-on" tab may be provided at end 10A to initiate scanning and heating of the powdered material The beam 13 is widened to cover the area of convergence or divergence of the edges 12, 14. The beam 13 continues down paths 16C on the concave side (edge 14) and 16D on the convex side (edge 12) and the beam scan widths along each side is narrowed for example to about 4 mm for each path. The wider divergence angle between paths 16C, 16D can be of advantage in overcoming surface tension and in achieving separation of the melt.

The concave path 16C is shorter than the convex path 16D so for equal path travel speeds, the concave path 16C finishes first. To further illustrate this staggered finish in reference to FIG. 5, when the energy beam 13 reaches point J along beam path 16C, the energy beam 13 is at point K along convex beam path 16D. As the convex path 16D then progresses past an end 10B of the concave path 16C, slag (from melted and cooled flux material) covering the concave path 16C deposit prevents re-melting of the underlying deposit. Rather than a delayed start in paths, this embodiment involves a delayed finish of paths As beam 13 completes the scan along beam path 16D, the metal deposited on the edge 12 has sufficiently cooled to avoid the above-referenced inter-path melt at adjacent substrates that are in such close proximity Moreover, to the extent that a flux material is used a layer of slag insulates an underlying recently deposited metal providing resistance to melting.

The above-described embodiments of dual-path energy beam processing may be performed in a preplaced bed or fluidized bed of powdered metal material and powdered flux material or by specialized feeding of such powders. In case multiple pass deposits are required, and because a layer of slag will form over the metal deposit, a slag removal tool may be provided to remove slag from the deposited metal layers While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A process comprising:
providing a powdered metal material to develop adjacent metal substrates;
providing a substantially convex metal substrate;
providing a substantially concave metal substrate, the convex metal substrate and the concave metal substrate connected to one another at opposite ends to define a continuous metal substrate;
selecting a first beam path starting point for a first beam path and a second beam path starting point for a second beam path;
activating and directing an energy beam at the first beam path starting point and traversing a portion of the first beam path;
redirecting the energy beam to the second beam starting point and traversing a portion of the second beam path; and
cycling the energy beam back and forth between the first beam path and the second beam path until a layer of material is deposited on the complete continuous metal substrate, wherein one of the first beam path and the second beam path extends substantially along the convex metal substrate and the other of the first beam path and the second beam path extends substantially along the concave metal substrate such that the first beam path and the second beam path cooperate to extend along the entire continuous metal substrate, and wherein the simultaneous heating is configured to keep a thermally-induced distortion of the one or both of the substrates within a predefined tolerance.

2. The process of claim 1 further comprising controlling the energy beam to move repeatedly from one beam path to the other beam path to scan and heat the powdered metal material along the respective beam paths.

3. The process of claim 1 wherein the process further comprises initially scanning the powdered metal material with the energy beam wherein the energy beam has a width dimension to cover both beam paths and then controlling the energy beam to move repeatedly from one beam path to the other beam path beginning at a point of divergence of the beam paths to scan and heat the powdered metal material along both beam paths.

4. The process of claim 3 further comprising decreasing the width dimension of the energy beam when the energy beam is controlled to move repeatedly from one beam path to the other beam path.

5. The process of claim 4 wherein the first and second beam paths converge downstream from the divergence of the beam paths and the process further comprising stopping the repeated movement of the energy beam from one beam path to the other beam path and increasing the width of the energy beam to scan the powdered metal material at the area of convergence of the beam paths.

6. The process of claim 3 wherein a processing power is associated with the energy beam and the process further comprising increasing the processing power of the energy beam during scanning of the powdered metal material when the energy beam is controlled to repeatedly move from one beam path to the other beam path.

7. The process of claim 3 wherein a processing speed is associated with the energy beam when it scans and heats the powered metal material along the beam paths and the process further comprising decreasing the processing speed along the beam paths when the energy beam is controlled to move repeatedly from one beam path to the other beam path.

8. The process of claim 1 wherein the step of selectively scanning and heating the powdered metal material comprises initiating the scanning and heating along one of the beam path and advancing the scanning to a predetermined point before initiating scanning along the other beam path.

9. The process of claim 8 wherein a processing speed of the energy beam along both beams is substantially the same along both beam paths.

10. The process of claim 1 wherein the step of providing the powdered metal material includes providing a bed of powdered metal material.

11. The process of claim 1 wherein the step of providing the powdered metal material comprises feeding the powdered metal material adjacent to the energy beam.

12. A process comprising:
providing a metal substrate having a first side and a second side opposite the first side, wherein the first side and the second side join one another at opposite ends to define a closed path;
providing a powdered metal material on the metal substrate;
scanning and heating a first portion of the first side of the metal substrate with an energy beam;
scanning and heating a first portion of the second side of the metal substrate with an energy beam;
controlling movement of the energy beam to repeatedly move from the first side to the second side to add a layer of material to the metal substrate along the entire closed path; and
wherein the movement of the energy beam is configured to keep a thermally-induced distortion of the component within a predefined tolerance.

13. The process of claim 12 further comprising first scanning and heating the component with the energy beam without the repeated movement of the energy beam and then controlling the repeated movement of the energy beam from the first portion to the second portion of the component at a point of divergence of the portions according to the predetermined profile of the component.

14. The process of claim 13 wherein the energy beam has a first width dimension before it is controlled to repeatedly move from the first portion to the second portion, and the process further comprising reducing the width dimension of the energy beam when it is controlled to repeatedly move from the first portion to the second portion of the component.

15. The process of claim 14 further comprising initiating the scanning with energy beam along one of the first or second portions and advancing the energy beam to a predetermined point before initiating scanning along the other of the first or second portions.

16. The process of claim 14, controlling a processing speed of the scanning to advance along both portions at substantially the same processing speed.

17. A process comprising:
fluidizing a bed of powdered material comprising powdered metal material and powdered flux material;
alternately scanning the powdered material with an energy beam along portions of a first beam path and portions of a second beam path opposite to the first beam path to simultaneously form a metal component having a first side corresponding to the first beam path and a second side opposite the first side corresponding to the second beam path, wherein the first beam path and the second beam path join one another to define a closed path; and controlling movement of the energy beam to repeatedly move back and forth between the first beam path and second beam path to scan and heat the portions of the powdered metal material to add a layer to the metal substrate according to a predetermined shape of the component that corresponds to the closed path while keeping a thermally-induced distortion within a predefined tolerance.

18. The process of claim 17 further comprising controlling movement of the energy beam along an initial beam path to a point of divergence of the initial beam path according to the predetermined shape of the component and then controlling the repeated movement of the energy beam between the first and second beam paths.

19. The process of claim 18 wherein the energy beam at the initial beam path has a width dimension, and the process further comprises reducing the width of the energy beam to a predetermined width when it is controlled to move repeatedly from the first beam path to the second beam path.

20. The process of claim 17 further comprising initiating the scanning of the powdered material along one of the beam paths for a predetermined time or distance before initiating the scanning of the powdered material along the other beam path.

* * * * *